Aug. 13, 1963 C. H. COLEMAN, JR., ETAL 3,100,816

TIMING CONTROL FOR SIGNAL REPRODUCING SYSTEMS

Filed Jan. 2, 1962 3 Sheets-Sheet 1

CHARLES H. COLEMAN, JR. &
PETER W. JENSEN
INVENTORS

BY Nathan N. Kallman

ATTORNEY

CHARLES H. COLEMAN, JR. & PETER W. JENSEN
INVENTORS

BY Nathan N. Kallman

ATTORNEY

CHARLES H. COLEMAN, JR. &
PETER W. JENSEN
INVENTORS

BY Nathan N. Kallman

ATTORNEY 3,100,816

TIMING CONTROL FOR SIGNAL REPRODUCING SYSTEMS

Charles H. Coleman, Jr., Belmont, and Peter W. Jensen, Fremont, Calif., assignors to Ampex Corporation, Redwood City, Calif., a corporation of California Filed Jan. 2, 1962, Ser. No. 163,817
8 Claims. (Cl. 178—5.4)

This invention relates to the reproduction of recorded signals with a high order of time base stability, and particularly to systems for reproducing color television signals stored on a movable magnetic medium.

Great advances have been made in recent years in recording and reproducing signal information. Thus it has become possible to record, store and reproduce black and white as well as color television signals on magnetic tape, thus performing completely electronic recording and reproduction to eliminate the need for color filming and for complicated photographic-to-electronic signal conversion processes. While it is always desirable to maintain the signal phase true to the actual time base, this is absolutely necessary with color television signals because loss of time base stability with resulting signal phase shift results in shifting of the chrominance and luminance components, with a resultant loss in the fidelity of the color picture.

While systems in accordance with the present invention may usefully be employed in achieving a high order of time base stability with a number of different signal reproducing systems, and indeed also with systems which do not utilize magnetic tape, primary uses of systems in accordance with the invention are to be found in the reproduction of color television signals, particularly from magnetic tape.

The color television signal is defined by a luminance component which corresponds essentially to the wideband monochrome signal and a specified chrominance subcarrier which consists of two components, in phase quadrature, which are separately modulated so as to represent the needed color information. The resultant of the two quadrature color signal components represents color or hue information by instantaneous phase, and color saturation information by instantaneous amplitude values. The reference for the chrominance subcarrier is found in the color synchronizing bursts which are inserted following each horizontal synchronizing pulse or signal. These color synchronizing bursts must always be maintained very close to the proper phase relative to the subcarrier components of the video signal. The chrominance subcarrier is specified as having a nominal frequency of 3,579,545 mc. $\pm 0.0003\%$ with a maximum rate of change which is not to exceed $\frac{1}{10}$ cycle per second per second. Preferably, the phase variation in the reproduced color subcarrier should not exceed 5° from the established standard if objectionable effects are not to be introduced into the color picture presented by conventional color television receivers.

The order of time base stability which is represented by these figures is actually of the order of nanoseconds. Achieving this order of precision with a partly mechanical system, such as a magnetic tape system, is only made possible through the use of electronic time base correction for effecting a fine but rapid adjustment of the time base.

A novel system providing the desired capabilities is disclosed and claimed in a previously filed application for patent entitled "Magnetic Tape Recording and Reproducing Systems," filed on September 12, 1961, Serial No. 137,680 by Peter W. Jensen and assigned to the assignee of the present invention. The system described in this prior application effects first a mechanical compensation and correction, and then utilizes successive electronic delay controls to secure the needed time base adjustment.

The all important final time base adjustment is controlled by the phase relationship of the color bursts to a reference signal. A selected component of the color burst is extracted and compared to the instantaneous value of a sawtooth reference waveform, and an error signal is then generated to return the composite television signals to the proper time base. The circuits have particular utility because they may be added to existing television recording and reproducing systems.

Although these systems are eminently satisfactory, they do employ a coarse electronic correction in most instances. The coarse electronic correction is made for the purpose of bringing the reproduced color burst into approximate time relationship to the reference signal, in order that the final correction may be made. It is desirable, of course, to be able to effect the adjustment in a single step, in order that the cost of the equipment and possible operative difficulties may be further reduced.

It is therefore an object of the present invention to produce an improved system for establishing a high order of time base stability in signals reproduced by a wideband data reproducing system.

Yet another object of the present invention is to provide an improved circuit for electronically adjusting the time base of color television signals.

A further object of the present invention is to provide an improved electronic time base correction circuit for wideband signals reproduced by a magnetic tape system.

These and other objects are achieved, in accordance with the present invention, by an electronic time base correction system that utilizes burst samples from the reproduced signal, the phases of which are compared with that of a reference signal. In a specific example of a system in accordance with the invention, the burst phase may be brought into coincidence with that of the reference signal from anywhere within a 360° range relative to the phase of such reference signal. Thus the phase may also be locked throughout a 360° phase deviation of the burst signal. A periodic sawtooth wave, which is representative of the phase of the reference signal, is arranged to have a periodical interval that corresponds to approximately 720° in phase. Sampling pulses are derived from the reproduced burst, to represent the phase of this burst, but these sampling pulses are always placed in the 0 to 360° portion of the sawtooth ramp, and no more than one sampling pulse is provided during this interval. Through this arrangement, there is complete control throughout the entire 360° range, and uniform operation throughout the entire range.

A better understanding of the invention may be had by reference to the following description, taken in conjunction with the accompanying drawings, in which.

Figure 1:
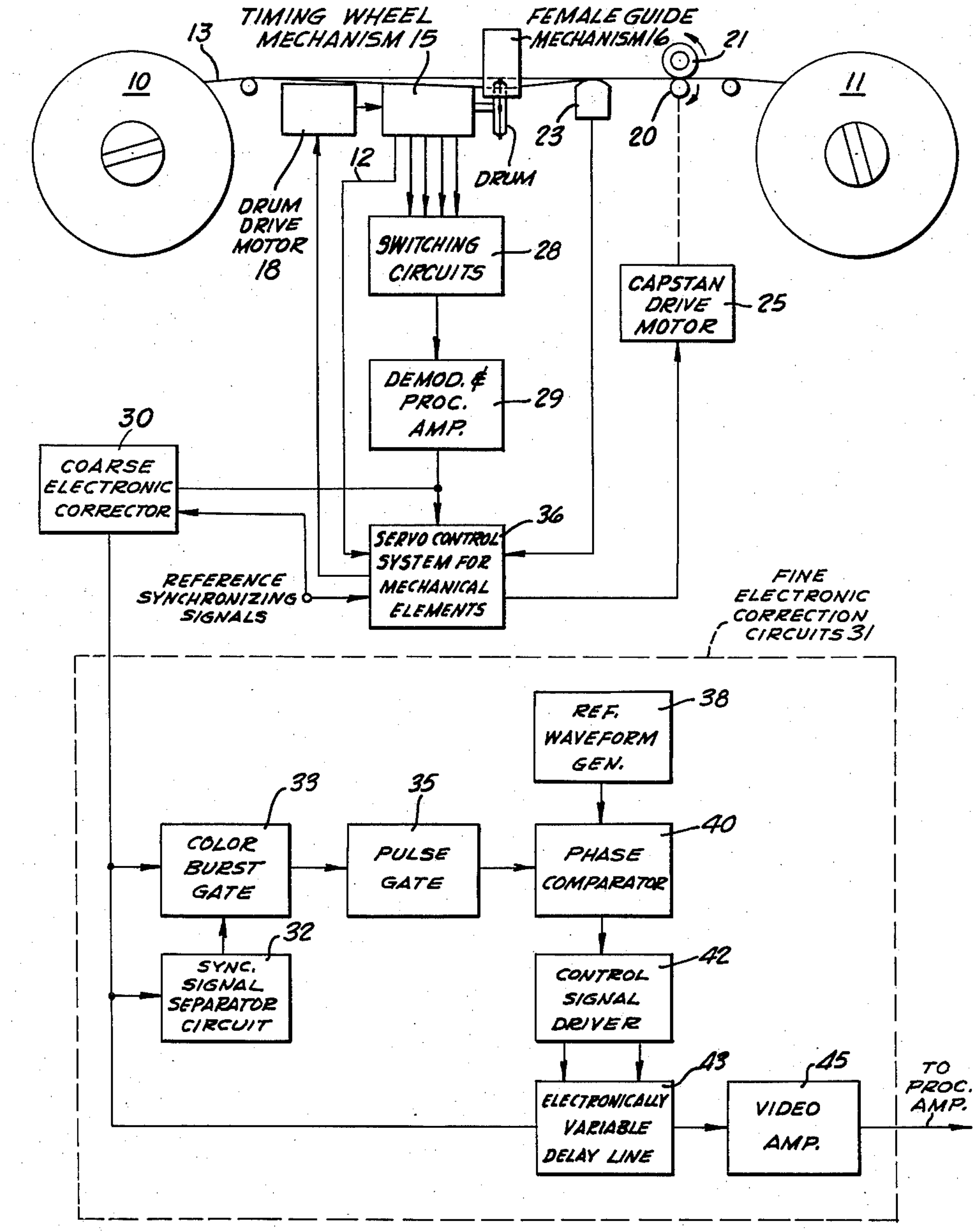
FIGURE 1 is a schematic representation and block diagram of a magnetic tape signal reproducing system in accordance with the present invention.

Although systems in accordance with the invention may be used with any reproduced signals which contain bursts representing phase information, they are particularly useful in connection with color television signal reproducers. The most efficient wideband system for color television signal storage and reproduction uses transverse track scanning of a relatively wide magnetic tape with multiple heads. Such a system is therefore illustrated in FIGURE 1, in schematic form. Details of the system are not shown, because reference may be made to published literature for a better understanding. However, the system conventionally includes a head drum having multiple magnetic heads that scan transversely across the relatively wide tape, with each head on the drum sweeping along a different transverse track. During the playback mode the signal information is reproduced by the different heads successively, so as to reconstitute the original composite color television signal. It will be recognized that only certain of the elements concerned with signal reproduction have been shown in FIGURE 1, in order to simplify the drawing. It is assumed here that the signal which is to be reproduced is the color television signal, defined according to the present standards of the United States Federal Communications Commission.

In FIGURE 1, the tape transport mechanism includes a supply reel 10 and a takeup reel 11, between which a tape 13 is fed past an operative zone within which the signal reproduction (and prior recording) is effected by a head drum and timing wheel mechanism 15 which engages the tape. The timing wheel mechanism may be used to record reference signals which indicate spurious speed variations that occur in the head drum during recording, and these reference signals provide an indication of the time base during signal reproduction. This is merely one example of the manner in which initial time base correction may be effected, because it is also known to use reference signals derived from the horizontal and vertical synchronizing pulses in the composite television signal itself. This is described in more detail below.

The width of the tape 13 is guided or cupped about the head drum so as to be held in contact with the rotating heads, by a guide mechanism 16. A drum drive motor 18 rotates the head drum and timing wheel mechanism 15 at a nominal rate during recording, and then at a controlled rate during signal reproduction. Longitudinal movement of the tape 13 between the reels 10 and 11 is effected by a drive capstan 20, which drives the tape as it is urged against the capstan by means of a rotatable pinch roller 21 in conventional fashion. Other details of the tape transport and drive mechanism, being conventional, have been omitted.

During operation in the recording mode, a timing signal is recorded longitudinally on the tape 13 by a separate recording head disposed adjacent to the edge of the tape. On playback, a magnetic pick-up head 23 positioned along this edge of the tape 13 reproduces these timing signals for control of the capstan speed by a servo control system 36. Also, timing information is derived by means of a lead 12 from the timing wheel mechanism 15 for controlling the angular speed and phase of the rotary head drum by means of the servo control system 36. An example of a suitable servo control system is set forth in U.S. Patent 3,017,462, entitled "Tape Apparatus Synchronizing System," assigned to the same assignee. The speeds of the drum drive motor 18 and a capstan drive motor 25 are governed by a servo control system 36 having impressed thereon the timing signal obtained from the magnetic head 23 as indicated.

Four magnetic heads are generally used in the transverse track recording and reproducing system, and at least one of these heads is reproducing signals at any given time. The signals from the different heads are fed to switching circuits 28 which are operated synchronously with the head drum to recombine the signals into a single channel so as to reconstitute the composite television signal. Thereafter, the signals may be passed through demodulator and processing amplifier circuits 29 which reform the original signal. Although excellent time base stability is achieved by systems of this type when used in general applications, even greater accuracy and stability are required for reproducing color television signals. This is so because phase errors from the color subcarrier introduce objectionable color effects in the picture reproduced on a conventional color receiver, even though the amount of error on a time base is in the nanosecond range, and so small as to be virtually indistinguishable by other means.

With a signal reproducing system of this type, it is preferred to employ a timing control arrangement such as that described in the aforementioned U.S. Patent 3,017,462. Such a system responds to the synchronizing signals forming part of the composite television signal and to reference synchronizing signals provided from a stable source (not shown) to effect a precise control of rotary drum speed and phase and capstan speed by the control of motors 18 and 25 during the playback mode. The system is particularly effective in maintaining synchronization and control over the picture even when there is random switching between different signal sources, or editing or revision of the tape.

In accordance with the present invention, it is desired to effect color phase correction by a single electronic time base correction of the composite signal which is derived from the demodulator 29. This correction is made in correction circuit sgenerally indicated at 30 and 31 which may advantageously utilize a number of the circuits described in the previously referred to patent application Serial No. 137,680, entitled "Magnetic Tape Recording and Reproducing Systems." An example of an electronic correction circuit useful as the coarse electronic corrector 30 may be found in the Journal of the SMPTE, July 1961, page 493, paragraph 4. The electronic correction circuits 31 operate directly in response to the color burst forming part of the composite color television signal, and compare this color burst appearing in the reproduced signal to a stable reference signal which is independently generated.

The partially time-base-corrected signal derived from the reproducing system is applied within the electronic correction circuits 31 to a synchronizing signal separator circuit 32, which extracts the entire horizontal synchronizing pulse component contained in the composite color television signal. The horizontal synchronizing pulse is followed by the color burst, which, as described above, provides both the phase and the frequency reference for the chrominance and luminance components in the composite color television signal. The horizontal synchronizing pulse is then used as a timing reference for gating the subsequent color burst, which is passed by a color burst gate 33 to a pulse gate 35, which selects particular parts of the waves of the color burst as samples of the actual phase of the color burst. Concurrently, a reference waveform generator 38 provides a stable waveform at the nominal frequency of the chrominance subcarrier. A time comparison is made between pulses passed by the pulse gate 35 and the signal from the reference waveform generator 38 in a phase comporator circuit 40 arranged in accordance with the present invention and which will be more fully described hereinafter in connection with FIGURE 2.

The phase comparator circuit 40 develops an error signal which is processed by the control signal driver 42 to generate suitable control voltages for an electronically variable delay line 43 such as defined in copending application Serial No. 137,368. The composite color television signals are also directly applied as shown to the electronically variable delay line 43, which effects the desired precise and final adjustment of the time base in accordance with the phase comparison. The output signal for the system is then derived from a video amplifier 45 coupled to the output terminal of the electronically variable delay line 43. This output signal is held, by the system in accordance with the invention, well within the specified standards, and is fully suitable for use in a color television transmitter.

Figure 2:
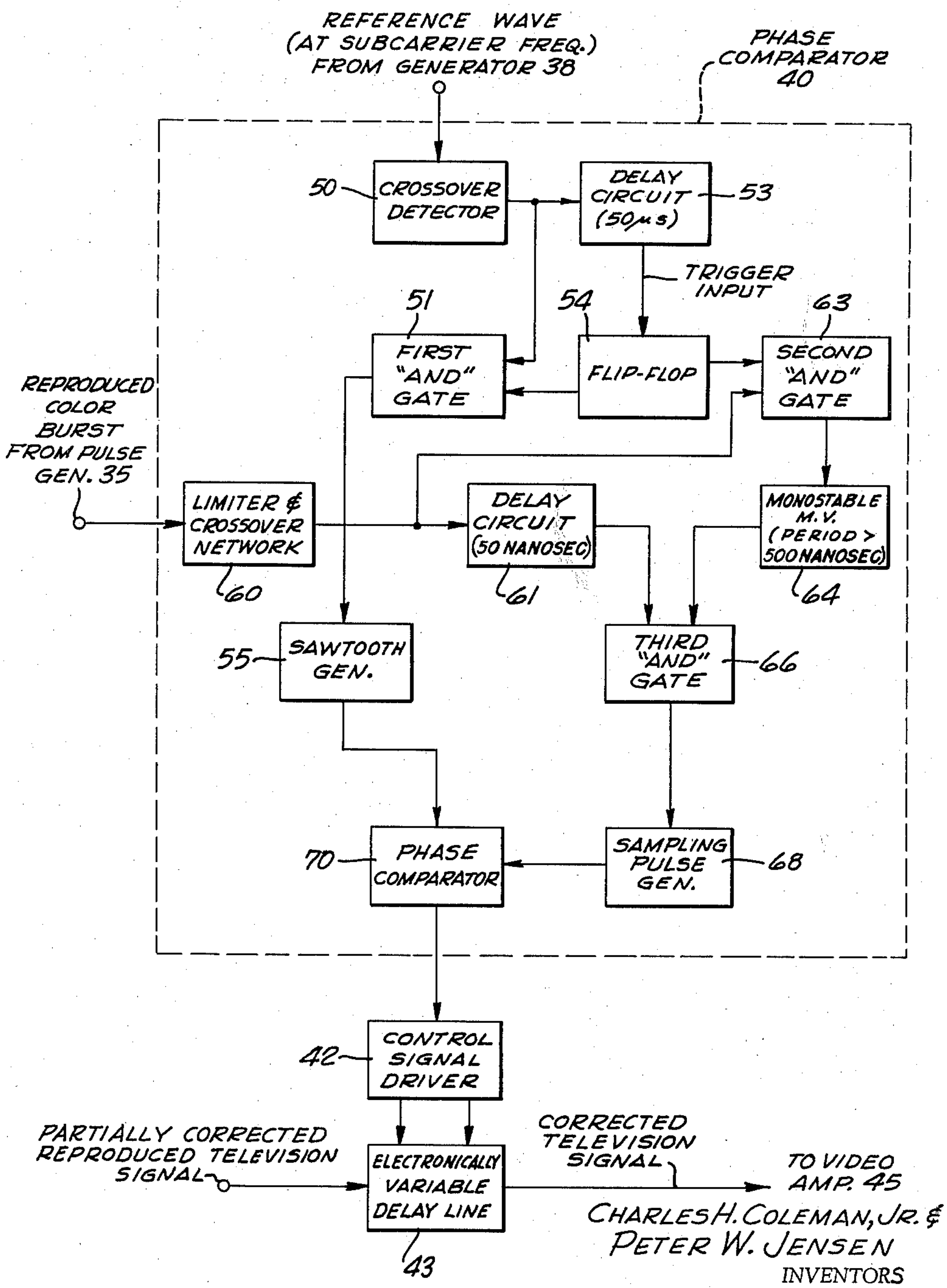
FIGURE 2 is a block diagram of elements employed in a phase comparison and error signal generating circuit in accordance with the present invention, and forming part of the reproducing system of FIGURE 1.

Phase comparison circuit to be used by the phase comparator 40 and by which control may be effected over the full 360° range of phase relationships between the reproduced color burst signal and the reference wave are shown in FIGURE 2. The stable reference wave from generator 38, provided at the nominal chrominance subcarrier frequency, is applied to a crossover detector circuit 50 which responds to a selected phase-representative characteristic in the cyclic reference wave. Assuming that this characteristic is the positive-going zero crossing, a pulse is provided from the crossover detector circuit 50 for each such zero crossing of the reference wave. With the chrominance subcarrier frequency which is specified above, the period between successive pulses is about 280 nanoseconds.

These pulses are applied to one input of a first "AND" gate 51, the remaining input terminal of which receives conditioning signals from a signal switching system which performs a binary divider function. Output pulses from the crossover detector 50 are also used for this function, these pulses first being passed through a delay circuit 53 providing a selected, relatively short delay time (here 50 nanoseconds). This delay, among others, has the purpose to allow discrimination between the pulses which perform the switching action and the pulses which are applied directly to the first "AND" gate 51. The delayed pulses from the delay circuit 53 are applied to the trigger input of a flip-flop 54, one output terminal of which is coupled to the remaining input of the first "AND" gate 51, so as to provide a first conditioning signal for the operation of the first "AND" gate 51.

Each trigger input pulse applied to the flip-flop 54 acts in conventional fashion to reverse its state. This occurs at 280 nanosecond intervals. Therefore, it will be noted that the first "AND" gate 51 is conditioned only during alternate 280 nanosecond intervals. The output pulses derived from the first "AND" gate 51 are applied to a sawtooth generator 55, which may be of the conventional type in which the ramp of the sawtooth waveform is initiated by the triggering pulse. The ramp here is of a duration which is an integral multiple, such as twice the period of the reference wave.

The actual phase of the reproduced color television signal is represented by the reproduced color burst derived by pulse gate 35. This color burst signal is applied to a limiter and crossover detector circuit 60. Here again, like phase-representative components such as the positive-going zero crossing are used to generate pulses which denote in time the actual phase of the reproduced color burst. The output pulses from the limiter and crossover detector 60 are applied to a second "AND" gate 63, which is also conditioned by the second conditioning signals derived from the remaining output terminal of the flip-flop 54. Concurrently, these output pulses from the crossover detector 60 are also applied to a delay circuit 61 which provides a 50 nanosecond delay, this delay being used to provide a compensating delay corresponding to that of the first delay circuit 53.

The second "AND" gate 63 is conditioned only during alternate intervals when the first "AND" gate is not conditioned. The pulses provided from the limiter and crossover detector 60 occur at a nominal interval of 280 nanoseconds, if (as is normally the case) the reproduced color television signal is substantially at the nominal frequency. When this is true, only alternate pulses from the crossover detector 60 are passed through the second "AND" gate 63 to actuate a monostable multivibrator 64 so as to provide a timed actuating pulse for a third "AND" gate 66. The maximum repetition rate of the pulse provided from the monostable multivibrator 64 is of the order of 500 nanoseconds. The pulse is made much longer than the 50 nanosecond delay introduced by the delay circuit 61. Accordingly, the pulse which actuates the monostable multivibrator 64 through the second "AND" gate 63 opens the third "AND" gate 66 in time for the delayed version of the same pulse to pass through the third "AND" gate 66. The delayed version of the pulse constitutes a sampling pulse which is representative of the phase of the reproduced color subcarrier.

One other factor should be noted about the monostable multivibrator 64. As is well known, such devices may be arranged to have a complete operating period or cycle of a selected duration, during which operating period they may not again be retriggered. Thus, although the monostable multivibrator provides a relatively brief output pulse to condition the third "AND" gate 66, it is arranged to thereafter return to a dwell interval in which it may not be retriggered. The total period is here selected to be in excess of 500 nanoseconds, which insures that only alternate ones of the pulses appearing at intervals of 280 nanoseconds provided by the crossover detector 60 are passed by the third "AND" gate 66. It may sometimes happen that the timing relationship of the actual color burst is such, relative to the stable reference wave, that the monostable multivibrator 64 would otherwise be actuated twice during a 560 nanosecond interval. By arranging the monostable multivibrator 64 so that this cannot happen, an erroneous triggering of the third "AND" gate 66 is prevented.

The output pulse from the third "AND" gate 66 is applied to a sampling pulse generator 68. The sampling or output pulse from the sampling pulse generator 68 occurs, therefore, in precisely timed relation to the selected phase-representative characteristics in the reproduced color burst. The sampling pulses are applied to a phase comparator 70, along with the sawtooth signal from the sawtooth generator 55. The phase comparator 70 provides an analog or error signal which is representative of the actual amplitude of the sawtooth waveform at the time of application of any sampling pulse. Therefore, this analog signal is a measure of the phase difference between the reference wave and the reproduced color burst. The error signal generated by the phase comparator 70 is applied to the control signal driver 42 to control the amount of delay introduced by the electronically variable delay line 43 in the reproduced television signal.

For simplicity, adjustable phase delay circuits which may be employed in each of the signal channels to effect a phase adjustment of the signals applied to the phase comparator 70, have not been shown. Similarly, the means for adjusting the control signal applied to the variable delay line 43 so as to compensate for the characteristics thereof are contained within the control signal driver 42 and need not be described in detail here.

Figure 3:
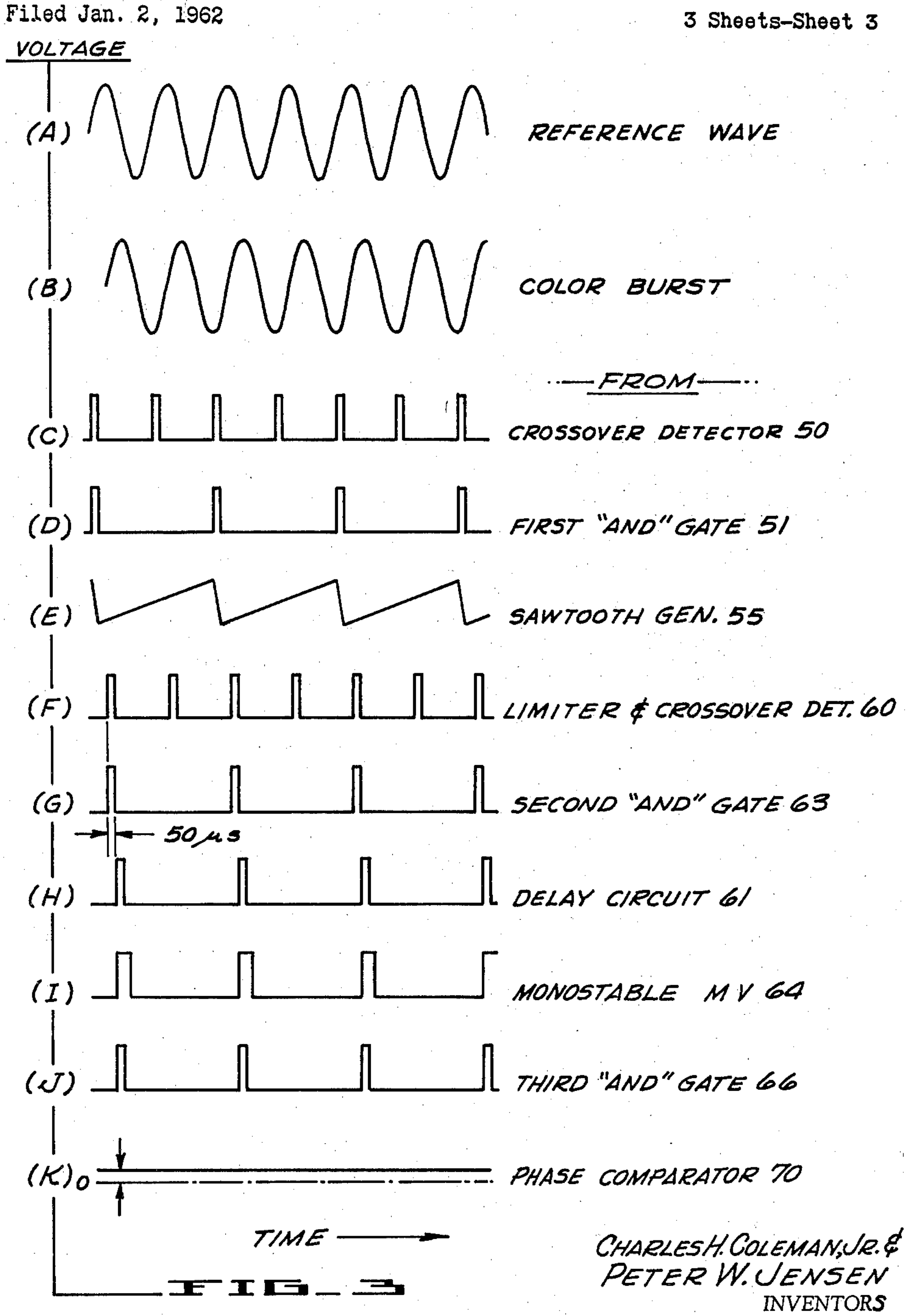
FIGURE 3 is a graph of waves plotted as a function of time occurring in the circuit of FIGURE 2.

A better understanding of the phase comparison may be had by reference to FIGURE 3, in conjunction with FIGURE 2. In FIGURE 3 there are presented a set of waveforms representing the signal variations occurring at different points within the system of FIGURE 2. Initially as shown in curves A and B of FIGURE 3 the reproduced color bursts have some phase displacement (here a delay of 90°) shown in B, from the phase of the reference wave (A) at the same frequency. Pulses, shown in waveform C, are derived from the first crossover detector 50 to represent the positive-going zero crossings in the reference waveform A but only alternate pulses, as shown in waveform D, are passed by the first "AND" gate 51.

If the flip-flop 54 is initially in the state in which the first conditioning signal is not applied to the first "AND" gate 51, then the pulse from the crossover detector 50 which is passed by the delay circuit 53 merely serves to reverse the state of the flip-flop 54, conditioning the first "AND" gate 51 for the next succeeding pulse from the crossover detector 50. Immediately after this reference pulse is received, however, and the output signal is provided from the first "AND" gate 51, the flip-flop 54 is again triggered. The signal from the first "AND" gate 51 initiates the ramp of the sawtooth waveform, as shown at E in FIGURE 3.

As soon as the pulse is passed by the first "AND" gate 51, therefore, the flip-flop 54 is again reversed in state, and the second conditioning signal is applied to the second "AND" gate 63, for the next subsequent pulse indicative of the actual phase of the color burst. In the example chose, this pulse is approximately 90° delayed in phase and, when applied, provides an output pulse from the second "AND" gate 63. This output pulse is applied to the monostable to the monostable multivibrator 64 which may not be triggered again for a period in excess of 500 nanoseconds.

Actually, if a pulse were to be received from the limiter and crossover detector 60 at an interval following the first pulse of greater than 280 nanoseconds but less than 500 nanoseconds, no pulse from the third "AND" gate would normally result, because the second conditioning signal would have been removed from the second "AND" gate 63 because of prior reversal of the flip-flop 54. On the other hand, without the use of the multivibrator 64, an overlap of pulses might occur even if there were not a wide frequency variation between the pulses. If, for example, the crossover detector 60 provides a relatively long pulse and there is virtually no phase displacement of this pulse from the pulse generated at the first "AND" gate 51, parts of two pulses may appear within a 280 nanosecond interval, particularly if the phase relationship of the color burst changes so as to shorten the time spacing between the two pulses. Of course, if the color burst is changing rapidly in frequency there will be a major deviation in the phase relationship with consequent erratic operation of the system.

Both of these possibilities are eliminated through the use of the monostable multivibrator 64 having a long time period which is greater than one full cycle of the reference wave but somewhat less than the two full cycles which are here used as the integral multiple of the reference sawtooth wave. Therefore, the successive nominally 280 nanosecond spaced pulses from the limiter and crossover detector 60, shown at waveform F, are not derived directly, but only the alternate pulses shown at G are used.

The pulses from the delay circuit 61 are delayed 50 nanoseconds, but occur within the interval of the pulses provided from the multivibrator 64, as shown by waveforms H and I respectively in FIGURE 3. Therefore, the sampling pulse generated from the third "AND" gate 66 and the sampling pulse generator 68 corresponds in time of occurrence and duration, as shown in waveform J to the sample pulse initially provided from the limiter and crossover detector 60, except for the relatively brief delay.

The phase comparator 70 provides the analog or error signal representative of the time relationship and phase displacement between the reproduced color burst and the reference wave, and the control signal driver 42 thereupon adjusts the electronically variable delay line 43. Note that this adjustment is made on a line-by-line basis with regard to the color television signal. Each color burst will contain approximately eight positive-going zero crossings, while the reference wave is provided continuously. In consequence, four phase comparisons may be effected during an individual color burst, from which the error signal may be generated with considerable exactitude, and maintained over an interval of two television scansion lines for controlling the phase adjustment introduced by the delay line 43.

This arrangement has a number of further particular advantages. For one thing, it is usually difficult to preserve the linearity of the phase comparison system, particularly within the starting and ending regions of a cycle, in which the error is smallest and where greatest precision is desired. With the sawtooth waveform, for example, the ramp portion of the waveform is most linear in the intermediate regions. The trailing edge of the ramp upon the initiation of a new ramp may require considerable fall time, and there may also be quite some overshoot before the ramp again begins a linear buildup. For these reasons, systems in accordance with the invention permit the entire 360° phase relationship to be measured relative to a linear portion of the ramp, due to the use of a ramp which is an integral multiple of a complete cycle.

Of course another important advantage of the invention relates directly to the fact that control can be exerted over the entire 360° of possible phase relationships.

While there have been described above and illustrated in the drawings circuits for electronically varying the phase of reproduced signals containing phase-representative components having a selected frequency, it will be appreciated that the invention is not limited thereto. Accordingly, the invention should be considered to include all alternative forms and modifications falling within the scope of the appended claims.

What is claimed is:

1. In a signal reproducing system providing a complex signal containing phase-related components of a subcarrier having a selected nominal frequency, a system for limiting the phase deviation of the complex signal including means responsive to the subcarrier for providing phase-representative pulses, means providing a stable reference signal at the selected nominal frequency, means responsive to the reference signal for providing a time-varying reference wave having a period twice that of the reference signal, switching means responsive to the reference signal for selecting alternate ones of the phase-representative pulses as sampling pulses, and means for comparing the phase relation of the reference wave and the sampling pulses to generate an error signal, and means for adjusting the phase of the complex signal in response to the error signal.

2. In a color television signal reproducing system, a circuit for electronically adjusting the phase of the color subcarrier components of the signals to minimize phase deviation including means for extracting color bursts from the reproduced color television signal, means providing a stable reference signal at the nominal color subcarrier frequency, means responsive to selected characteristics of the stable reference signal for providing first and second conditioning signals representative of alternate cycles of the stable reference signal, means responsive to a selected phase-representative characteristic of the stable reference signal and the first conditioning signal for providing a sawtooth waveform having a period twice that of the stable reference signal, means responsive to a selected phase-representative characteristic of the color bursts and to the second conditioning signal for providing a sampling signal representative of the phase of the color bursts within the first half of the sawtooth waveform, means responsive to the sawtooth waveform and the sampling signal for generating an error signal representative of the phase deviation of the color bursts, and electronically variable delay means coupled to receive the color television signal for phase adjustment and coupled to be controlled by the error signal.

3. A magnetic tape system for reproducing a color television signal having color bursts with satisfactory time base stability including means providing a color burst phase signal representative of actual timing variations in the reproduced color television signal, means providing a stable subcarrier reference signal, means providing a line-by-line comparison between the phases of the burst signal and the reference signal, characterized by means responsive to the subcarrier reference signal for generating a reference sawtooth waveform having a period twice that of the reference signal but a phase relationship controlled by the subcarrier reference signal, means responsive to the burst phase signal for generating a sampling pulse from every other burst, and means for interlocking the last two means so that a sampling pulse results over a full 360° range of the subcarrier.

4. In a system for storing a complex signal on a movable magnetic storage medium and reproducing the complex signal therefrom, apparatus for maintaining the phase relationship of the complex signal within permissible small errors with respect to a reference wave having a nominal frequency of the order of megacycles in spite of unavoidable variations in the speed of the magnetic medium during storage and reproduction of the complex signal, the apparatus comprising means for generating a sawtooth wave in timed phase relationship with the reference wave but having a period twice that of the reference wave, means for developing sampling pulses in response to a selected phase-representative characteristic of the complex signal, each sampling pulse occurring once during each sawtooth wave, means responsive to the sampling pulses and to the sawtooth wave for generating an error signal representative of the phase deviation of the complex signal from the reference wave, and electronically variable delay means coupled to receive the complex signal reproduced from the storage medium for phase adjustment thereof and coupled to be controlled by the error signal to maintain the phase relationship of the complex signal and reference wave substantially constant.

5. In a color television signal storage and reproducing system wherein storage and reproduction of the television signal causes unavoidable phase shifts between the color subcarrier components of the color television signal and a wave at the nominal color subcarrier frequency, apparatus for correcting such phase shifts including means for generating color burst pulses representative of the phase of the color bursts forming part of the color subcarrier components and occurring once during each two cycles of the subcarrier, means providing a sawtooth waveform having a period twice that of the nominal color subcarrier, phase comparison means responsive to the color burst pulses and the sawtooth waveform for developing an error signal represenative of phase deviations between the pulses and the waveform, and electronically variable means responsive to the error signal for delaying the television signal to compensate for the original phase shift.

6. In a magnetic tape system for initially storing and thereafter reproducing a color television signal including color subcarrier components having color bursts, wherein the phase relationship of the subcarrier of the reproduced color television carrier is unavoidably varied due to variations of the tape speed, apparatus for correcting the phase deviations and providing satisfactory time base stability, the apparatus comprising means for segregating the color bursts from the reproduced color television signal, means prividing a stable reference signal at the nominal subcarrier frequency, means responsive to a selected phase-representative characteristic of the stable reference signal for developing first and second conditioning signals, each occurring during alternate cycles of the stable reference signal, means responsive to the selected phase-representative characteristic of the reference signal and the first conditioning signal for developing a sawtooth wave having a period twice that of the reference signal, means responsive to a selected phase-representative characteristic of the color bursts and to the second conditioning signal to develop a sampling signal representative of the phase of the color bursts within the first half of the sawtooth wave, and means for comparing the sawtooth wave and the sampling signal and for delaying the color television signal in accordance with the phase deviation of the color bursts to adjust the phase thereof.

7. In a magnetic tape system for initially storing and thereafter reproducing a color tlevision signal including color subcarrier components having color bursts occurring once during each line, wherein the phase relationship of the subcarrier of the reproduced color television signal is unavoidably varied due to variations of the tape speed, apparatus for correcting the phase deviations and providing satisfactory time base stability, the apparatus comprising means for developing sampling pulses from the color bursts, each sampling pulse occurring once during each two cycles of the color bursts and being representative of the phase thereof, means for developing a sawtooth wave having a period twice that of the nominal subcarrier period, means responsive to the sampling pulses and the sawtooth wave for developing an error signal representative of the relative phase relationship of the color bursts and the nominal subcarrier, and an electronically variable delay line responsible to the error signal for delaying the reproduced color television signal to re-establish the original phase relationship in a line-by-line fashion.

8. In a magnetic tape system for initially storing and thereafter reproducing a color television signal including color subcarrier components having color bursts occurring once during each line, wherein the phase relationship of the subcarrier of the reproduced color television signal is unavoidably varied due to variations of the tape speed, apparatus for correcting the phase deviations and providing satisfactory time base stability, the apparatus comprising means for developing sampling pulses from the color bursts, each sampling pulse occurring once during each two cycles of the color bursts and being representative of the phase thereof, means for developing a sawtooth wave having a period twice that of the nominal subcarrier period, and means for comparing the sampling pulses and the sawtooth wave and for delaying the reproduced color television signal to re-establish the original phase relationship in a line-by-line fashion.

No references cited.